United States Patent [19]

Wallis

[11] Patent Number: 5,063,801
[45] Date of Patent: Nov. 12, 1991

[54] CUT-OFF MACHINE AND METHOD FOR TUBING

[76] Inventor: Bernard J. Wallis, 2215 Dacosta, Dearborn, Mich. 48128

[21] Appl. No.: 462,049

[22] Filed: Jan. 8, 1990

Related U.S. Application Data

[63] Continuation-in-part of Ser. No. 300,754, Jan. 23, 1989, Pat. No. 4,939,967.

[51] Int. Cl.$^5$ .................... B23D 21/00; B26D 1/60
[52] U.S. Cl. ............................. 83/37; 83/76; 83/286; 83/303; 83/311; 83/320; 83/327
[58] Field of Search ............. 83/37, 76, 318, 311, 83/321, 327, 328, 303, 320, 286, 360, 350

[56] References Cited

U.S. PATENT DOCUMENTS

| | | | |
|---|---|---|---|
| 2,416,652 | 2/1947 | Stevens et al. | 83/318 |
| 2,575,417 | 11/1951 | Heyman | 83/647.5 |
| 3,082,655 | 3/1963 | Voigt | 83/647.5 |
| 3,623,387 | 11/1971 | Mehnert | 83/646 |
| 4,462,290 | 7/1984 | Wallis | 83/311 |
| 4,643,063 | 2/1987 | Gobien | 83/311 |
| 4,919,025 | 4/1990 | Snyder | 83/647.5 |

Primary Examiner—Hien H. Phan
Attorney, Agent, or Firm—Barnes, Kisselle, Raisch, Choate, Whittemore & Hulbert

[57] ABSTRACT

A cut-off machine adapted to be positioned downstream from a source, such as a tube mill, for receiving a moving length of tube stock from the mill and severing plural predetermined lengths from the moving length. The machine comprises a plurality of cut-off assemblies that are reciprocated longitudinally of the moving length of material and operated during the movement of sever plural predetermined lengths. Each cut-off assembly comprises a cutter blade that is supported for movement in an arcuate path and for radial movement. A cam in the path of each blade is engaged by a cam follower movable with the blade to cause the blade to move in a straight line transversely of the flattened tubing while severing the tube length.

26 Claims, 9 Drawing Sheets

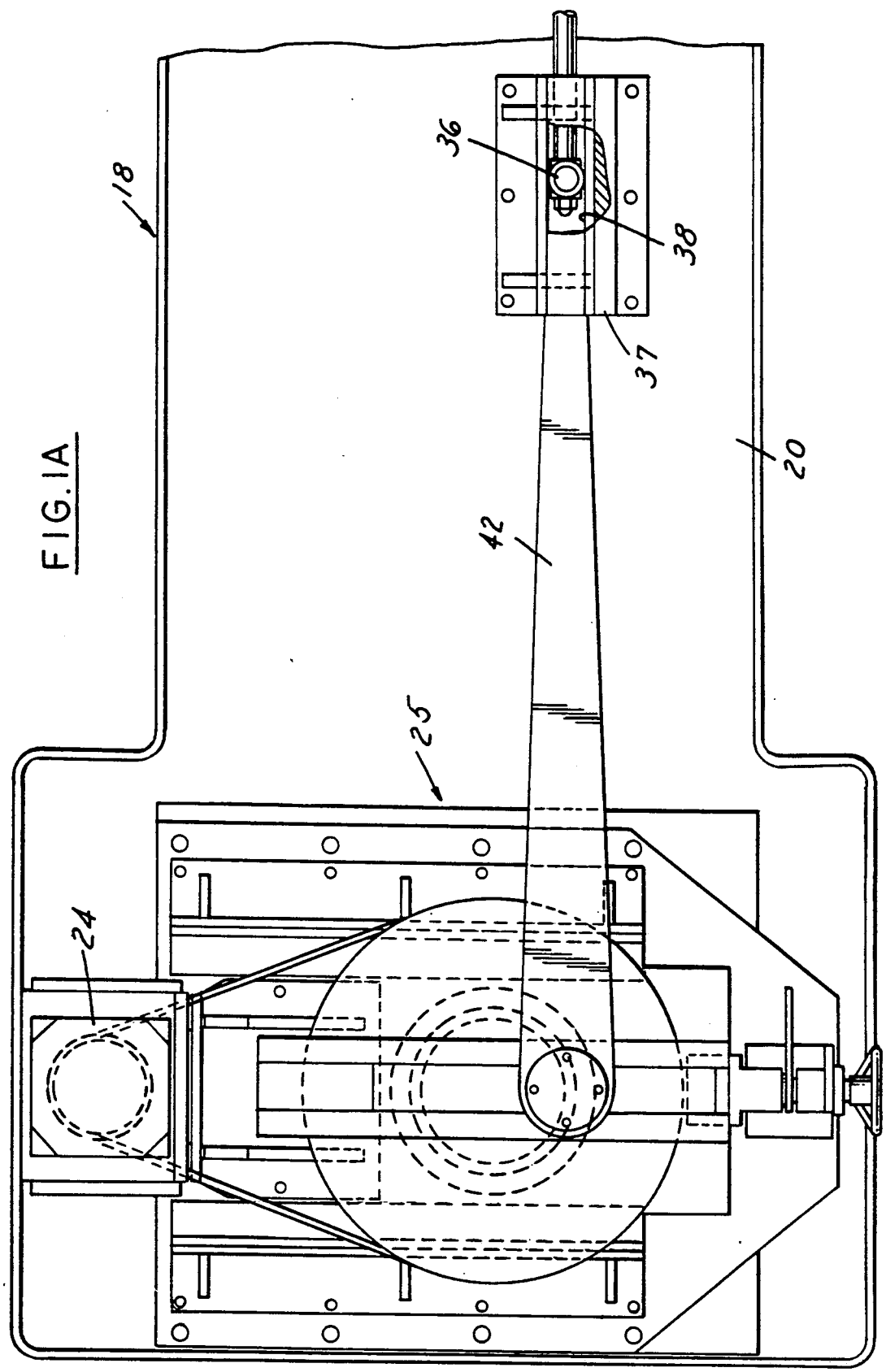

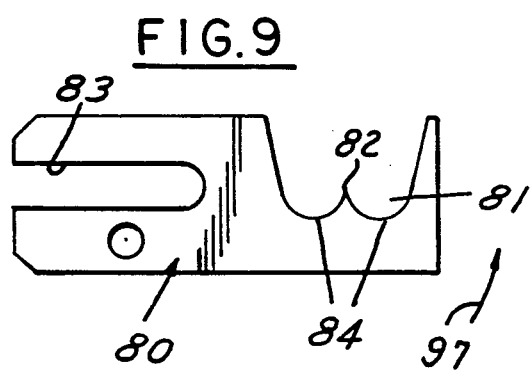
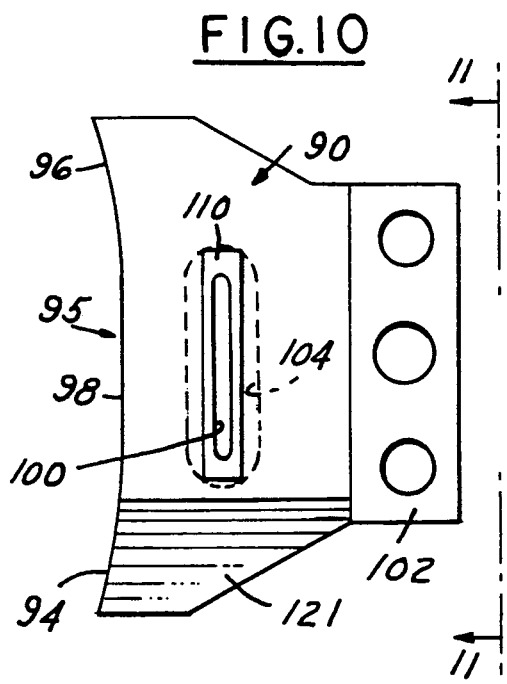
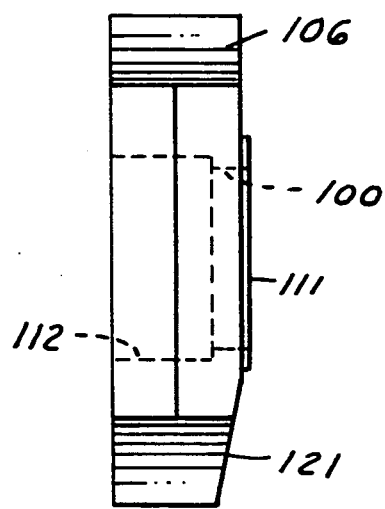
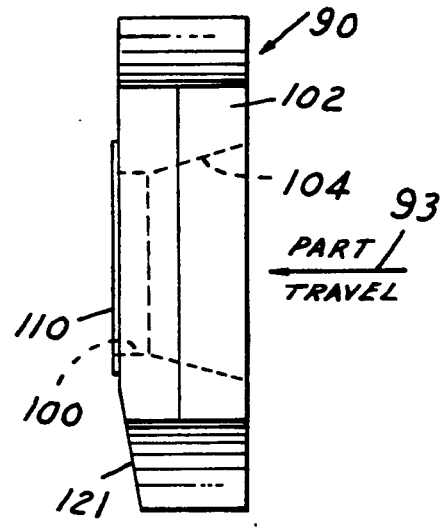

CUT-OFF MACHINE AND METHOD FOR TUBING

This application is a continuation-in-part of application Ser. No. 07/300,754 filed Jan. 23, 1989, now U.S. Pat. No. 4,939,967.

The present invention relates to severing of roll-formed tube stock and the like, and more particularly to an improved machine and method for severing a continuous length of tube stock into individual lengths as the stock moves at high speed in a continuous uninterrupted motion in the direction of its length.

BACKGROUND AND OBJECTS OF THE INVENTION

In the manufacture of many products, such as heat exchangers for example, there is a need for large quantities of tubes cut to very precise lengths with ends accurately perpendicular to the axis of the tube stock. Machines for cutting such tubes to length have been provided heretofore. From the standpoint of economy, it is a practical necessity that such machines be capable of cutting tubes while a continuous length of tube stock is moving in the direction of its length at relatively high speed, preferably as the tubing leaves the last forming stage of a tube mill. Thus, such machines invariably employ a slide of some type on which a cut-off device is mounted and means for moving the slide at the same speed as the tube during the severing operation. Heretofore, complicated and costly devices have been employed for synchronizing the speed of the tubing and the slide on which the cut-off device is mounted. Such synchronizing devices have been not only expensive, but also incapable of functioning accurately when the tube speed is high, for example, in excess of about 175 feet per minute.

In prior U.S. Pat. No. 4,462,290, a tube cut-off unit is arranged at the downstream end of a tube mill and is powered by a drive unit mechanically driven by the main shaft of the mill that drives the tube forming rolls. The drive unit mechanically rotates a crank which, through a link, reciprocates a slide along the path of travel of the tube. A tube cut-off blade on the slide is cam actuated by motion of the slide along its base to move in a straight line laterally of the tube to sever the tube. The slide moves at a constant speed and at the same speed as the tube when the tube is severed.

In co-pending application Ser. No. 07/300,754, the cut-off machine comprises a plurality of cut-off assemblies that are reciprocated on a slide longitudinally of the moving length of tube formed by the mill, and are operated during such movement to sever plural predetermined lengths. The reciprocating and cutting movements are mechanically derived from an electric motor driven in synchronism with the speed of the tubing length. The apparatus includes mechanisms that permit the length of the severed tubes to be changed while the machine is operating. Each cut-off assembly includes a knife blade mounted on a chain for movement in an endless path in a plane perpendicular to the path of the tubing. A portion of the blade path is in a straight line transversely to the axis of movement of the moving length of tubing when the blade intersects the tubing path and severs the tube stock.

Although the cut-off machines disclosed in the noted patent and application, both by the inventor herein, have addressed and overcome problems theretofore extant in the art, and have enjoyed substantial success, improvements remain desirable. For example, the structure in the prior art patent and application for synchronizing motion of the knife blade to the tube stock is relatively complex, requiring attention of a trained technician to implement adjustment to accommodate differing stock lengths and/or wear on the moving parts. It is therefore a general object of the present invention to provide a cut-off machine and method that may be implemented in a device having a reduced number of moving parts, that include facility for rapid electronic adjustment for differing part lengths and/or wear of moving parts, and that include facility for enhanced control of the overall severing operation.

SUMMARY OF THE INVENTION

A continuous length of material such as tube stock is severed into individual stock lengths in accordance with the present invention by propelling the stock in a continuous uninterrupted motion in the direction of its length along a predefined path. A slide or carriage is continually reciprocated in a direction parallel to the stock path in synchronism with motion of the stock along the path such that velocity of the carriage is equal to velocity of the stock during a portion of each carriage motion cycle. A knife blade is continually rotated on the carriage about an axis parallel to the stock path and in synchronism with motion of the stock along the path such that the knife blade intersects the stock path during the portion of the carriage motion cycle in which carriage velocity equals stock velocity. As the knife blade intersects the path, the knife blade is moved radially inwardly of its axis of rotation, such that the compound result of rotary and radial motion of the knife blade with respect to its axis of rotation moves the knife blade in a straight line tangential to its axis and transverse to the path when the knife blade intersects the stock path and severs the stock.

Apparatus in accordance with a presently preferred embodiment of the invention thus includes a carriage having at least one cut-off assembly positioned thereon to receive a continuous length of stock material. The carriage is reciprocated along the stock path in synchronism with motion of the stock material length. A knife blade is mounted by a support on the carriage for rotation about an axis parallel to the stock path such that the knife blade periodically intersects the path. The knife blade is moved radially of its axis of rotation as it intersects the stock path, preferably by engagement of a follower roller on the knife blade with a cam positioned adjacent to the stock path.

The cam in the preferred embodiment of the invention takes the form of a die assembly that includes a guide for receiving the stock material, a slot transverse to the guide for receiving the knife blade, and a cam surface positioned in radial opposition to the blade axis of rotation. The cam follower includes a spring resiliently urging the knife blade radially outwardly of its axis of rotation, and a roller on the knife blade for engaging the cam surface as the knife blade travels through the slot to push the knife blade radially inwardly against the spring.

Most preferably, a plurality of cut-off assemblies are mounted on the carriage and spaced from each other lengthwise of the stock path, and a shaft interconnects the plurality of cut-off assemblies so that the associated knife blades intersect the stock path and sever the tube stock substantially simultaneously. The carriage and knife blades are driven by respective electric motors that are synchronized to each other and to motion of the tube stock by a sensor that engages the tube stock upstream of the cut-off assemblies and provides a synchronizing signal to the motor drive electronics indicative of stock motion in the direction of its length.

BRIEF DESCRIPTION OF THE DRAWINGS

The invention, together with additional objects, features, and advantages thereof, will be best understood from the following description, the appended claims and the accompanying drawings in which:

FIGS. 1A and 1B comprise a plan view of a tube cutoff machine embodying the invention;

FIG. 5 is a fragmentary sectional view on an enlarged scale taken substantially along the line 5—5 in FIG. 7;

FIG. 9 is an elevational view of a knife blade utilized in each cut-off assembly;

FIG. 10 is an elevational view of one of the die/cams utilized with each cut-off assembly;

FIG. 11 is a view taken along the line 11—11 in FIG. 10;

FIG. 12 is a view similar to FIG. 11 showing the other cam and die segment utilized in each cut-off assembly.

DETAILED DESCRIPTION OF PREFERRED EMBODIMENT

Figure 1B:
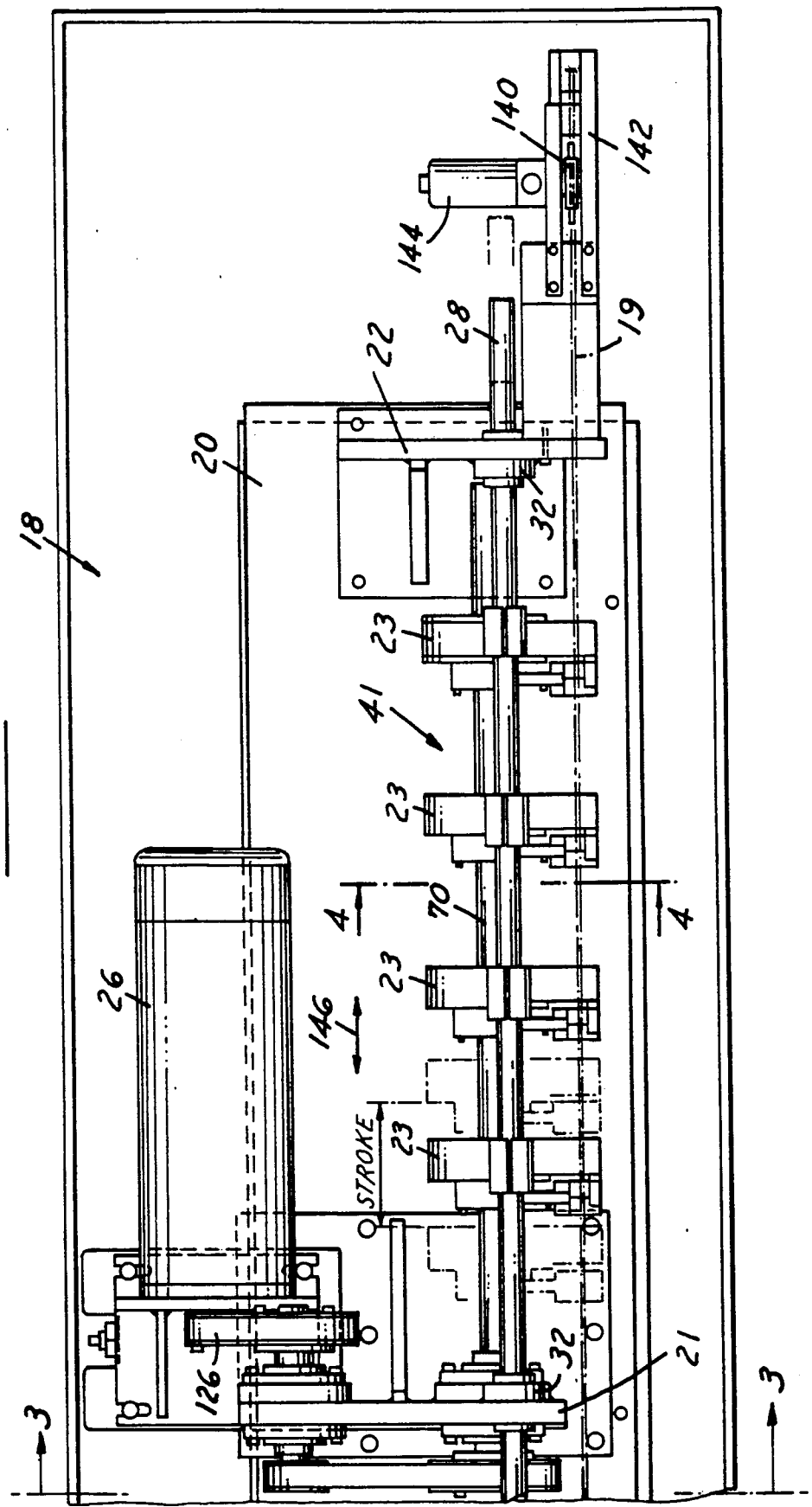
Figure 2:
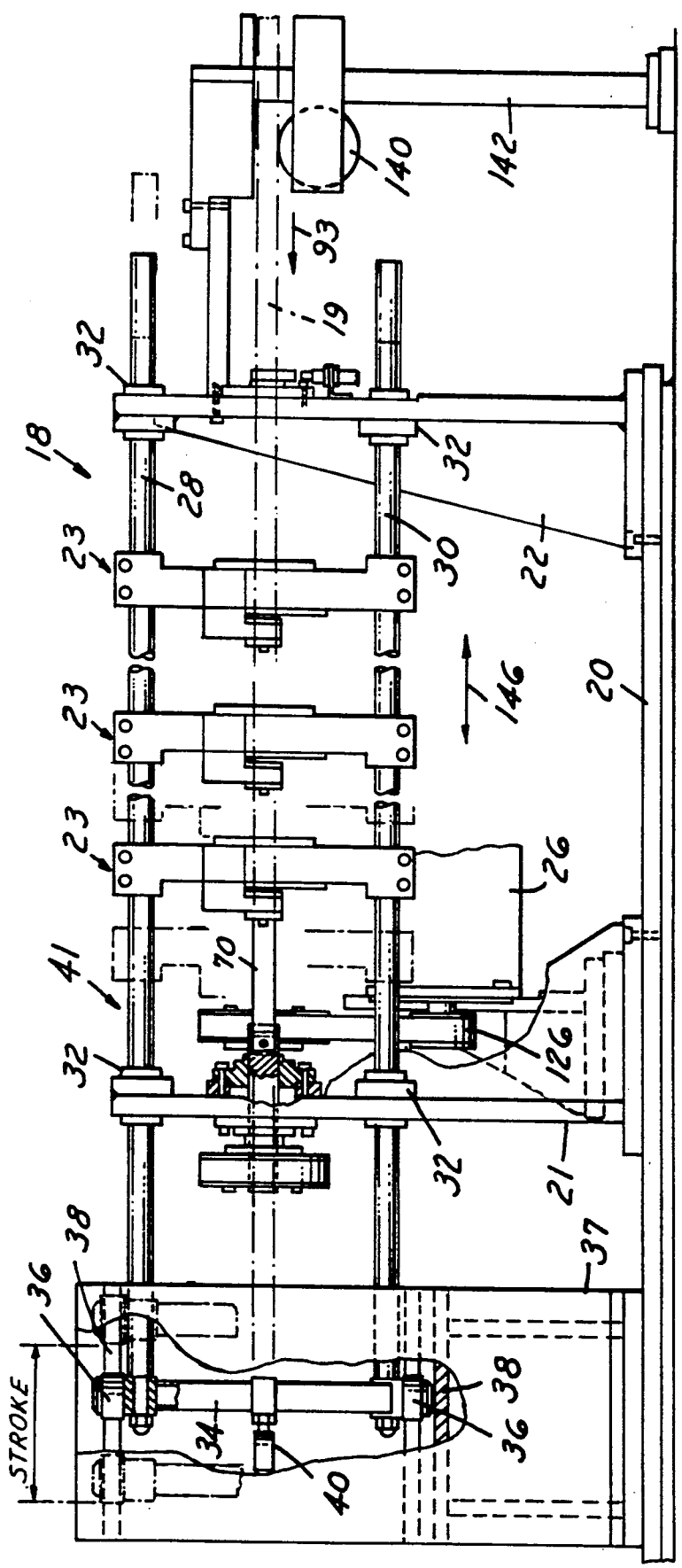
FIG. 2 is a fragmentary partially sectioned elevational view of the cut-off portion of the machine in FIG. 1B.

Referring to FIGS. 1A, 1B and 2, a cut-off machine 18 embodying the present invention is adapted to receive a continuous moving length of flattened tube stock 19 from a source such as a tube mill, and to sever a plurality of individual lengths from the moving length of the tube stock as the stock moves away from the tube mill. Machine 18 comprises a base 20 having uprights 21, 22 (FIGS. 1B and 2) that support a plurality of tube cut-off assemblies 23. Assemblies 23 are mounted on a pair of vertically spaced shafts 28, 30 and are spaced from each other longitudinally of the path of tube stock 19. Shafts 28, 30 are slidably mounted on uprights 21, 22 by linear bearings 32, and are coupled by a vertical bar 34 and a link 40 to a crank arm 42 (FIG. 1A). Crank arm 42 is eccentrically connected to a gear and crank assembly 25 that is driven by an electric servo motor 24. Thus, shafts 28, 30 and bar 34 form a carriage assembly 41 driven by motor 24, assembly 25 and crank arm 42 to reciprocate longitudinally of the path of tube stock 19 in a direction parallel thereto. Rollers 36 (FIGS. 2 and 3) on opposed ends of bar 34 engage tracks 38 mounted by a support 37 on base 20 for guiding link 40 and bar 34.

Figure 6:
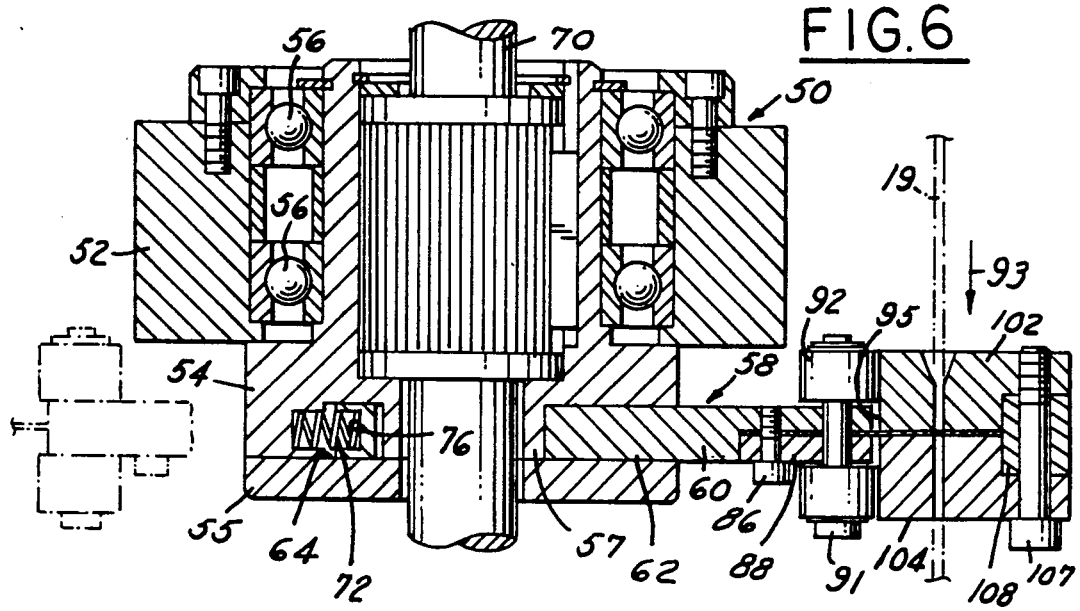
FIG. 6 is a fragmentary sectional view on an enlarged scale taken substantially along the line 6—6 in FIG. 3.
Figure 7:
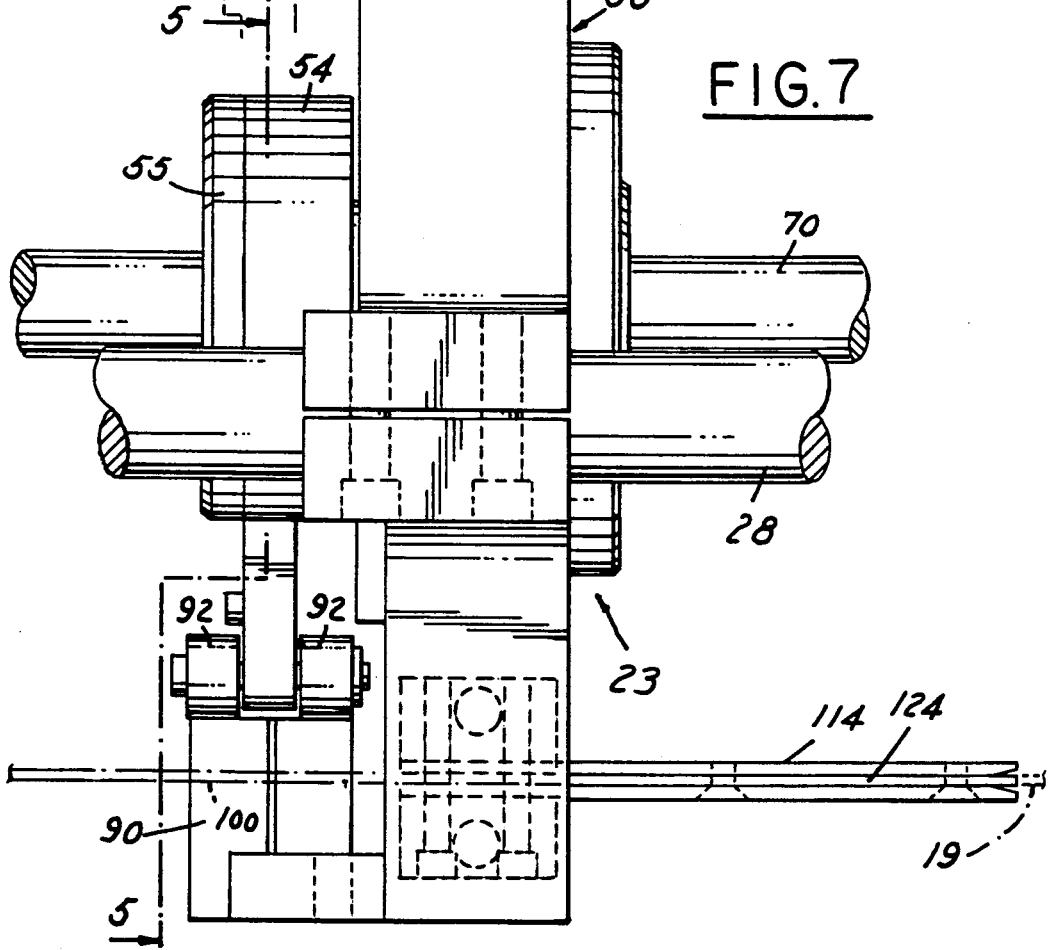
FIG. 7 is a fragmentary plan view on an enlarged scale of one of the tube cut-off assemblies.

Referring to FIGS. 4–8, each cut-off assembly 23 comprises a body 50 having split ends (FIGS. 4 and 7-8) clamped to shafts 28, 30 by suitable bolts 51, and a central hub portion 52 in which a hub 54 is rotatably mounted by bearings 56 (FIG. 6). Hub 54 is keyed to a drive shaft 70 so as to be rotatably driven by the drive shaft. A cover 55 (FIGS. 4 and 6-8) is affixed to hub 54 surrounding shaft 70 so as to form a pocket or cavity 64 surrounding a central sleeve 57 on hub 54.

A knife assembly 58 is affixed to each hub 54 so as to rotate conjointly therewith. Knife assembly 58 comprises a knife blade 80 clamped by a screw 86 and a spacer 88 to one end of a knife blade support 60. The opposing end 62 of support 60 is enlarged, and has a central opening that encircles sleeve 57 of hub 54 within cavity 64. As best seen in FIG. 5, the central opening of 68 of knife holder portion 62 is enlarged radially of shaft 70 so as to accommodate limited sliding motion of holder 60 within a guide slot 66 that extends radially through hub 54. A coil spring 72 is captured in compression between a recess 74 on hub 54 and an opposing recess 76 in knife holder portion 62 for urging holder 60 radially outwardly of hub sleeve 57. Knife blade 80 is fastened to the outer end of support 60. Radially outwardly of support 60, blade 80 includes a severing cavity 81 with arcuate cutting edges 84 forming a cusp or apex 82 that engages the tube stock. A slot 83 in knife blade 80 provides for lengthwise adjustment of the knife blade on the end of holder 58. A pair of rollers 92 (FIGS. 4–7) are mounted on a shaft 91 at the end of knife blade holder 60 on longitudinally opposed sides thereof (with respect to direction 93 of motion of stock 19).

Figure 8:
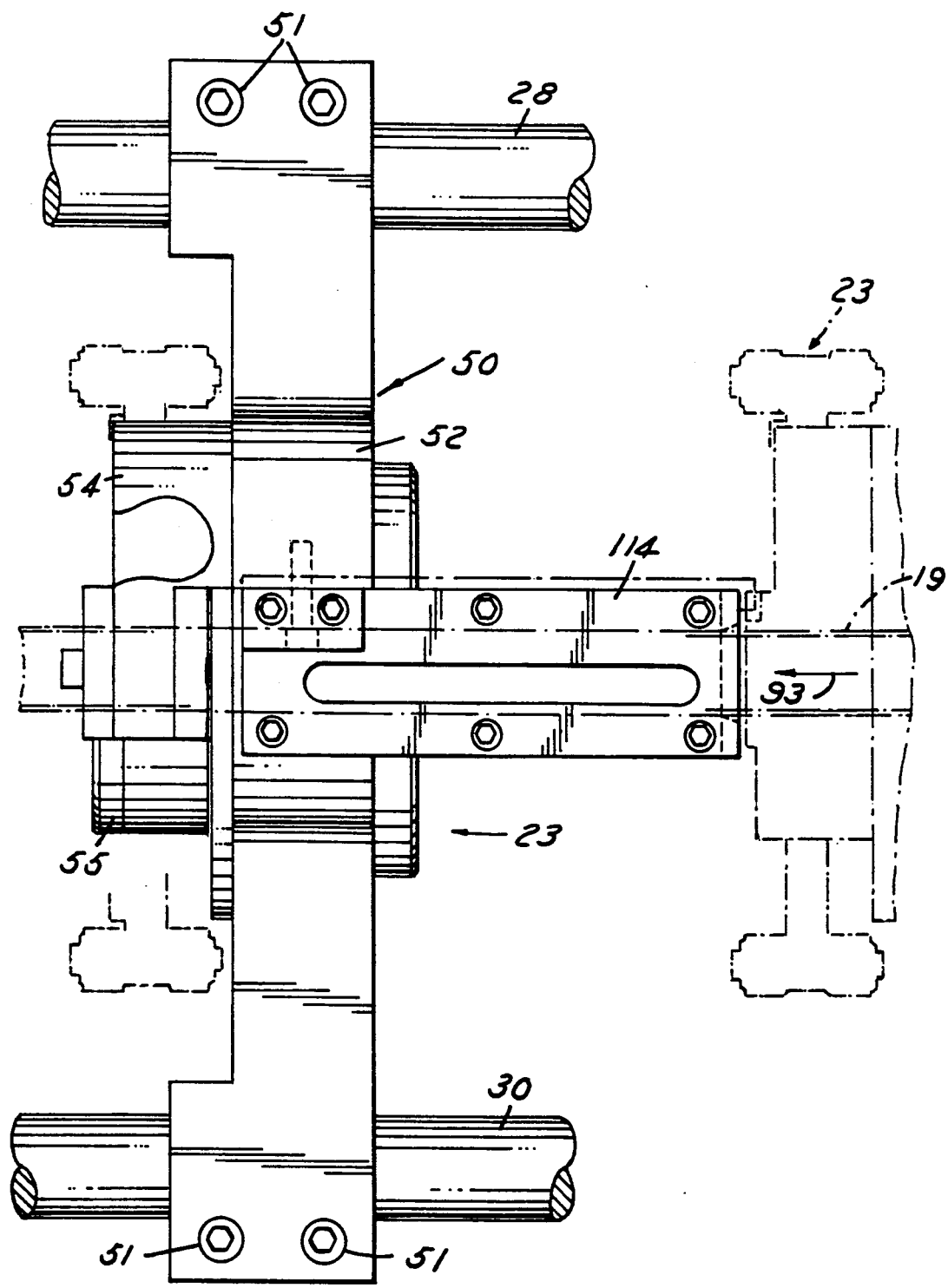
FIG. 8 is a fragmentary elevational view of the tube cut-off assembly shown in FIG. 7.

A severing die and cam assembly 90 is mounted on each cut-off assembly body 50 radially outwardly of hub 54 and in radial alignment with drive shaft 70. Each die and cam assembly 90 comprises an entrance die 102 and an exit die 104 clamped to each other by a screw 107 and a spacer 108 (FIG. 6). A guide opening 100 extends through the die assembly for receiving and guiding flattened tube stock. Entry die 102 includes an outwardly flared mouth 104 leading to its associated portion of guide 100. Likewise, exit die 106 has an enlarged exit opening 112 communicating with its associated guide 100. The lower portion of each die element 102, 106 is angulated outwardly at 120 to form an entry to a blade-receiving slot between the die elements. A raised portion 110, 111 surrounds each guide portion 100 at the opposing faces of die elements 102, 106 to form bearing surfaces for passage of the knife blade therebetween. An entry guide 114 (FIGS. 7-8) is mounted on body 50 in upstream alignment with die guide opening 100, and has a slot 124 aligned with the die guide opening for receiving and guiding tube stock 19 to and through the guide opening. Each guide 114 extends upstream to a position adjacent to the upstream cutter assembly 23, as best seen in FIG. 8.

Each die segment has a cam surface 95 in radially opposed alignment with shaft 70. Surface 95 has an arcuate entry portion 94 (FIG. 10), with respect to direction 97 of rotation of knife blade 80, that decreases in radius with respect to the axis of shaft 70. An exit surface portion 96 is complementary to surface portion 94. The portion 98 between surface portions 94, 96 is substantially flat and has a transverse dimension substantially equal to the transverse dimension of guide opening 100. The surface 95 of dies 102, 106 are aligned longitudinally of axis 70 and are at a position for opposing engagement with rollers 92.

Figure 3:
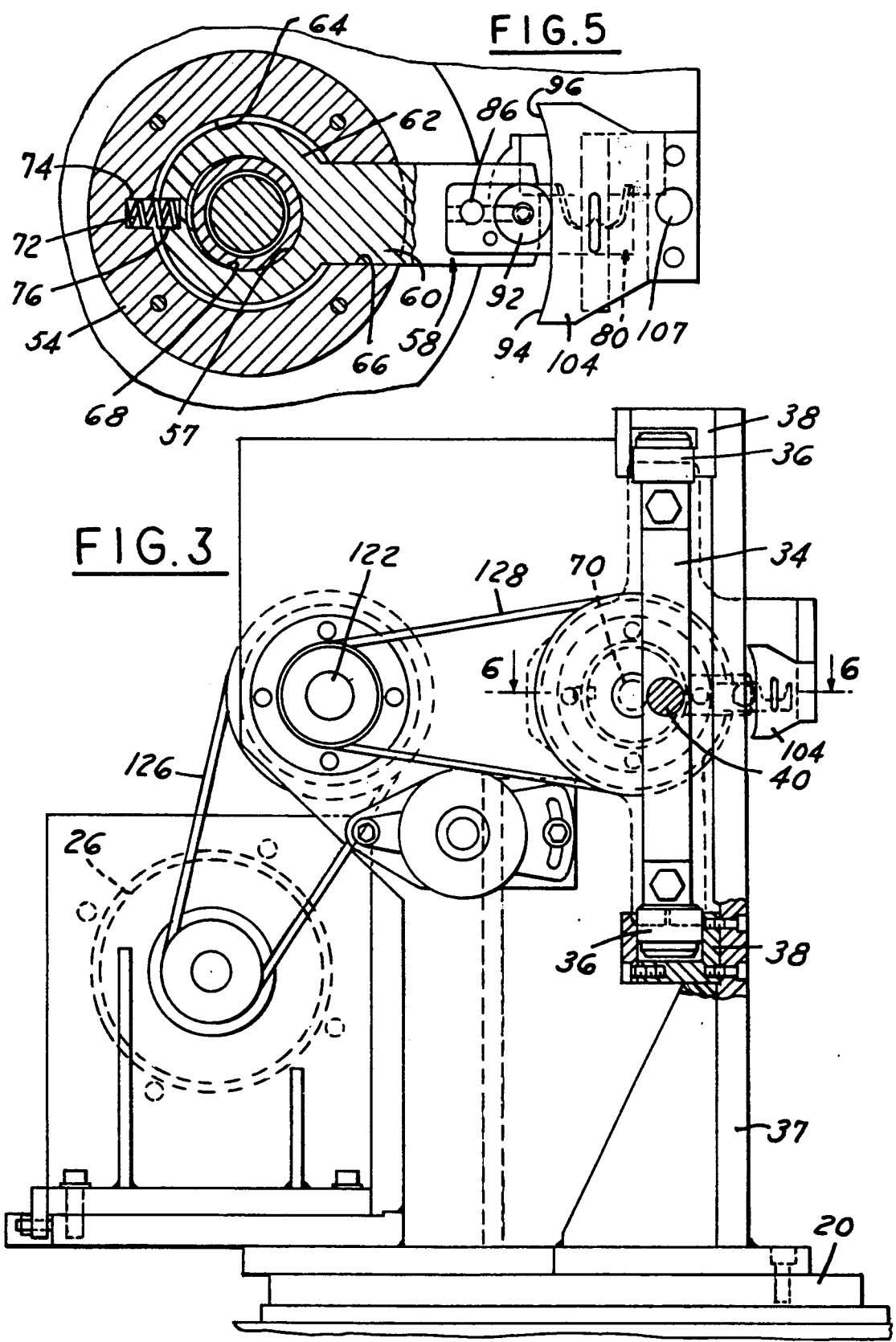
FIG. 3 is a sectional view taken substantially along line 3—3 in FIG. 1B.
Figure 4:
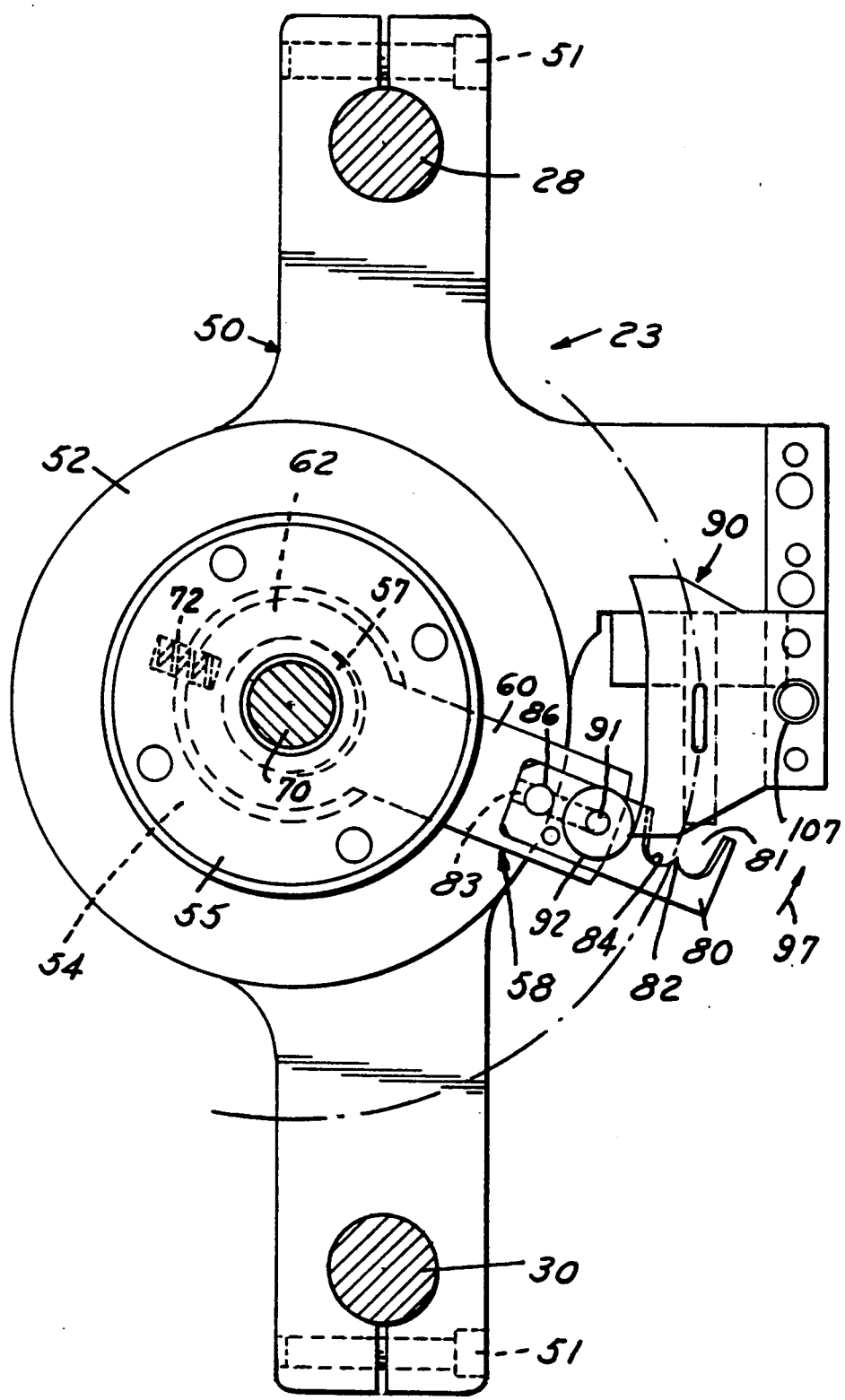
FIG. 4 is a fragmentary sectional view on an enlarged scale taken substantially along the line 4—4 in FIG. 1B.

A servo motor 26 (FIGS. 1B-3) is mounted on upright 21 and is connected by a belt 126 and associated pulleys to a secondary shaft 122 (FIG. 3). Shaft 122 is connected in turn by a drive belt 128 and associated pulleys to drive shaft 70. Drive shaft 70 has opposed ends rotatably mounted on uprights 21, 22, and interconnects all of the cut-off assemblies 23 to as to drive the associated knife blades in synchronism, preferably so as to sever the tube stock at the associated cut-off assemblies substantially simultaneously.

Figure 13:
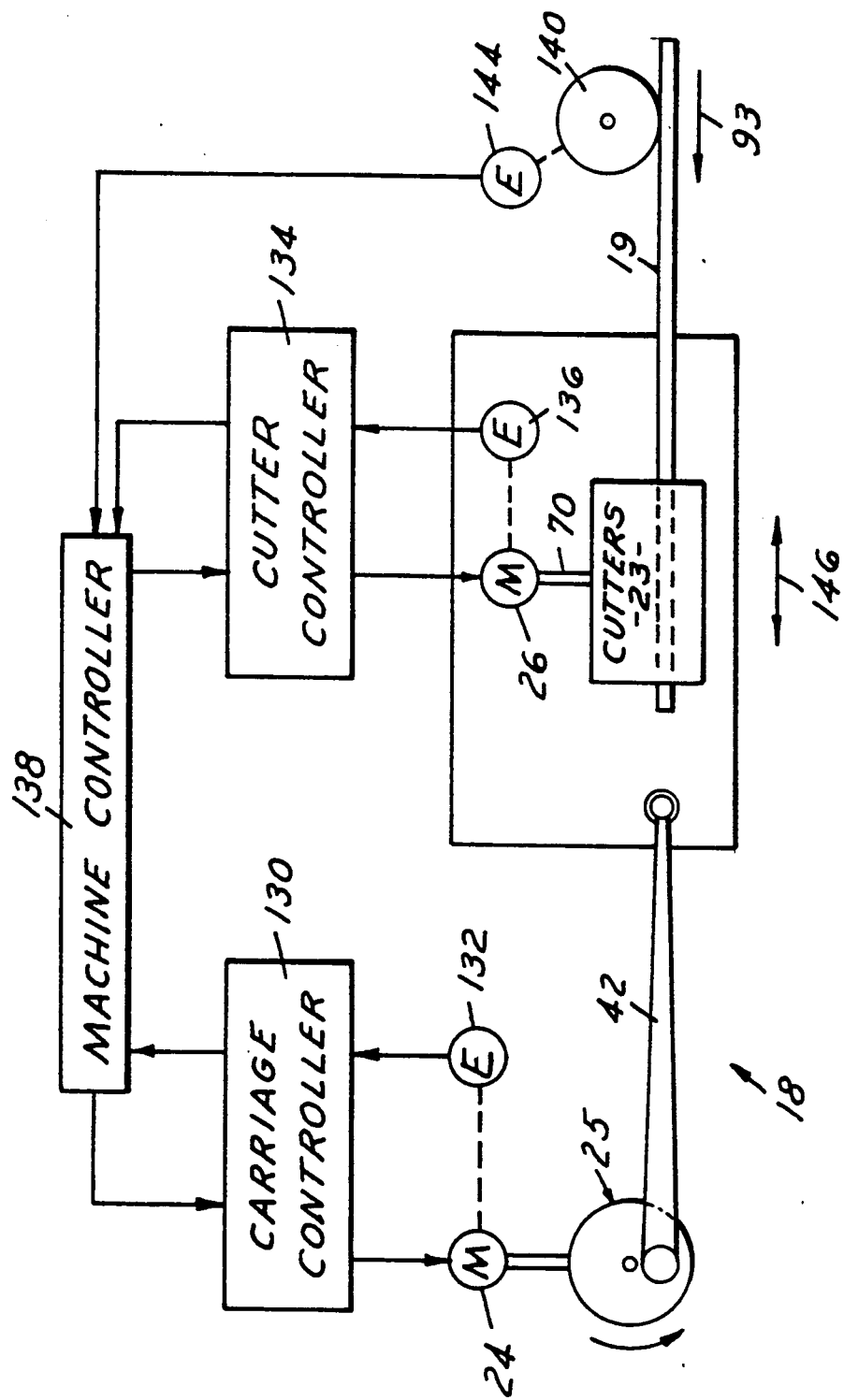
FIG. 13 is a functional block diagram of the cut-off machine control electronics.

FIG. 13 is a functional block diagram of the machine operating mechanism and control electronics. Carriage-drive servo motor 24 is driven by an associate carriage controller 130 and provides a feedback signal to the carriage controller through a position encoder 132 coupled to the motor. Likewise, blade-drive servo motor 26 is driven by an associated controller 134 and provides feedback to the controller through a position encoder 136. Controllers 130, 134 receive control signals from, and provide associated feedback signals to, an overall machine controller 138. A wheel 140 (FIGS. 1B, 2 and 13) is carried by a support 142 at a position adjacent to the path of tube stock 19 and is resiliently urged into rotating engagement with tube stock. Wheel 140 is coupled to an associated encoder 144 (FIGS. 1B and 13) for providing an electronic signal to machine controller 138 indicative of motion of stock 19 in direction 93 for synchronizing operation of controllers 130, 134, and of the associated motors and drive mechanisms, to longitudinal motion of tube stock 19 in the direction of its length.

In operation, tube stock 19 is propelled in the direction 93 of its length in a continuous uninterrupted motion. Wheel 140 (FIGS. 2 and 13) and encoder 144 provide a corresponding control signal to machine control 138. Normally, tube stock 19 is propelled at substantially constant velocity, although velocity variations can be tolerated and accommodated because of wheel 140 and encoder 144 that synchronize machine operation to stock motion. Carriage 41 is continually reciprocated by motor 24, crank assembly 25 and crank arm 42 in the direction 146 (FIGS. 1B, 2 and 13) parallel to direction 93 of stock motion. During at least the central portion of such motion in either direction, and most importantly in the direction 93 of stock motion, the velocity of carriage motion, determined by controller 130, is equal to the velocity of stock motion. The knife blades 80 of the several cutter assemblies 23 are continuously driven by shaft 70 around the axis of shaft 70. The cutter blades intersect the path of tube stock 19 within the respective die assemblies 90, with cutting edge cusp 82 being aligned with guide 100 as shown in FIG. 5.

As each knife assembly 58 approaches the associated die assembly, rollers 92 engage entry portions 94 of cam surfaces 95. As rollers 92 traverse surfaces 94, the knife assemblies are urged radially inwardly against the associated springs 72. The rollers then engage the substantially flat portions 98 of cam surfaces 95, during traversal of which the effective knife blade radii decrease to the central position illustrated in FIG. 5, and thereafter begin increasing. However, the effect of cam surface 95 and rollers 91 on the knife assemblies is such that the knife blades traverse guides 100 with the knife cutting edges traveling in a straight line co-linear with guides 100 tangential to the axis of drive shaft 70 and transverse to the longitudinal dimension of the tube stock. Thus, the tube stock is severed by the knife blades while the knife blades travel in a straight line transverse to the stock axis, and while the knife blades are carried by the carriage longitudinally of the stock axis at the same velocity as the stock. In this way, the tube lengths are severed so that the tube length ends are perpendicular to the tube axis. Continued rotation of the knife assembly brings rollers 92 into engagement with cam surface portions 96, at which the radius of the blade cutting edge gradually increases to the normal position at which the blade knife is extended radially outwardly by spring 72.

We claim:

1. A method of severing a continuous length of tube stock into individual stock lengths comprising the steps of:
   (a) propelling the stock in a continuous uninterrupted motion in the direction of its length along a predefined path,
   (b) continually reciprocating a carriage in a direction parallel to said path in synchronism with motion of said stock along said path such that velocity of said carriage is equal to velocity of stock in said path during a portion of the motion of said carriage,
   (c) continually rotating a knife blade on said carriage about an axis parallel to said path and synchronized with motion of said stock along said path such that said knife blade intersects said path during said portion of each motion cycle, and
   (d) as said knife blade intersects said path, moving said knife blade radially inwardly of said axis, such that as a compound result of rotation and radial movement with respect to said axis, said knife blade moves in a straight line tangential to said axis and transverse to said path as said knife blade intersects said path.

2. The method set forth in claim 1 wherein said step (d) comprises the steps of:
   (d1) positioning a roller on said knife blade,
   (d2) resiliently urging said knife blade radially outwardly of said axis, and
   (d3) rotating said knife blade in said step (c) to bring said roller into engagement with a cam surface adjacent to said path to push said knife blade radially inwardly toward said axis.

3. The method set forth in claim 1 for severing a plurality of lengths from said strip stock wherein said step (c) comprises the steps of continually rotating a plurality of knife blades so that said blades intersect said path substantially simultaneously.

4. The method set forth in claim 1 comprising the further steps of:
   (e) sensing lineal motion of said tube stock along said path in said step (a), and
   (f) electronically synchronizing said steps (b) and (c) to such sensed lineal motion.

5. A cut-off machine adapted to be positioned downstream from a source for receiving a moving length of material such as tubing from the source and severing individual lengths from the moving length,
   said machine comprising a plurality of cut-off assemblies which are reciprocated longitudinally of the moving length from the source and operated during the movement away from the source to sever predetermined lengths,
   means for supporting each said cut-off assembly for reciprocating movement, and
   means for reciprocating said cut-off assemblies in synchronism with the speed of the moving length delivered by the source to the machine,
   each said cut-off assembly comprising a support,
   means for supporting a knife blade on said support for rotary and radial movement bringing the knife blade into the path of the tubing, and cam means operable to move the knife blade in a straight line transversely of the tubing at the cut-off.

6. The cut-off machine set forth in claim 5 wherein said cam means comprises a cam adjacent to the path of the tubing and a cam follower associated with each said blade, said cam having a portion adapted to guide the blade in said straight line.

7. The cut-off machine set forth in claim 6 wherein said means for supporting said knife blade comprises means for yieldingly urging said knife blade radially outwardly and means for guiding said knife blade radially in said radial outward movement.

8. The cut-off machine set forth in claim 7 wherein said yieldingly-urging means comprises spring means yieldingly urging said knife blade radially outwardly.

9. The cut-off machine set forth in claim 8 wherein said means for supporting said knife blade comprises a rotating hub, said knife blade including a knife support having an enlarged portion mounted within said hub, said hub having an opening for receiving said enlarged portion, said opening being larger than the enlarged portion such that the enlarged portion is movable radially relative to the hub.

10. The cut-off machine set forth in claim 9 including anti-friction means associated with said cam follower.

11. The cut-off machine set forth in claim 9 wherein said cam follower comprises spaced rollers on said support.

12. The cut-off machine set forth in claim 9 wherein said cam comprises spaced cam members, said cam members having aligned passages for passage of said tubing.

13. The cut-off machine set forth in claim 12 wherein said spaced members include axially spaced contact members adapted to be engaged by the knife blade as it is moved to cut off a length of tubing.

14. The cut-off machine set forth in claim 5 wherein said reciprocating means comprises a first electric motor, wherein said blade-mounting means comprises a second electric motor, and wherein said machine further comprises means for operating said first and second electric motors in synchronism with motion of material along said path.

15. A cut-off machine for receiving a continuous length of material such as tube stock and severing the material into individual lengths comprising:
carriage means including at least one cut-off assembly positioned to receive said continuous length of material moving in the direction of its length in a predetermined path, and means for reciprocating said carriage means along said path in synchronism with motion of the material length; characterized in that said cut-off assembly comprises:
a support mounted on said carriage means,
a knife blade,
means mounting said knife blade on said support for rotation about an axis parallel to said path such that said knife blade intersects said path, and
means for moving said knife blade radially of said axis as said knife blade rotates about said axis and intersects said path, such that said knife blade moves in a straight line tangential to said axis and transverse to said path as said knife blade intersects said path.

16. The cut-off machine set forth in claim 15 wherein said radially-moving means comprises cam means mounted on said support in fixed position radially of said axis and cam follower means carried on said knife blade at a position to engage said cam means.

17. The cut-off machine set forth in claim 16 wherein said cam means comprises a die assembly including a guide for receiving the material length, a slot transverse to said guide for receiving said knife blade, and a cam having a cam surface opposed to said axis.

18. The cut-off machine set forth in claim 17 wherein said follower means comprises means resiliently urging said knife blade radially outwardly of said axis, and means on said knife blade for engaging said cam surface as said knife blade travels through said slot to push said knife blade radially inwardly against said resiliently-urging means.

19. The cut-off machine set forth in claim 18 wherein said cam surface has a flat surface portion disposed between said path and said axis.

20. The cut-off machine set forth in claim 18 wherein said blade-mounting means comprises a blade drive shaft, a mounting hub coupled for rotation with said shaft, and means mounting said blade on said hub.

21. The cut-off machine set forth in claim 20 wherein said knife blade is mounted on a holder that includes an enlarged portion having an opening encircling a portion of said hub, said resiliently-urging means comprising a spring captured in compression between said enlarged portion and said hub diametrically across said axis from said knife blade.

22. The cut-off machine set forth in claim 21 comprising a plurality of said cut-off assemblies carried on said carriage means spaced from each other lengthwise of said path, said shaft interconnecting said plurality of cut-off assemblies and driving all of the associated knife blades.

23. The cut-off machine set forth in claim 15 wherein said reciprocating means comprises a first electric motor, whereas said blade-mounting means comprises a second electric motor, and wherein said machine further comprises means for operating said first and second electric motors in synchronism with motion of material along said path.

24. The cut-off machine set forth in claim 23 wherein said motor-operating means comprises a sensor positioned adjacent to said path upstream of said cut-off assembly for sensing motion of the material along said path, and electronic control means for operating said first and second motors as synchronous functions of output of said sensor.

25. A cut-off machine for receiving a continuous length of material such as tube stock in a continuous uninterrupted motion in a predetermined path and severing the material into individual lengths, said machine comprising:
carriage means including means for reciprocating said carriage means along said path, and at least one cut-off assembly on said carriage including a knife blade and means for moving said knife blade transversely of said path to sever material in said path,
said blade moving means comprising
means mounting said knife blade on said carriage for rotation about an axis parallel to said path such that said knife blade intersects said path, and
means for moving said knife blade radially of said axis as said knife blade rotates about said axis and intersects said path, such that said knife blade moves in a straight line tangential to said axis and transverse to said path as said knife blade intersects said path, comprising a first electric motor coupled to said carriage, in that said blade-moving means comprises a second electric motor coupled to said blade, and in that said machine further comprises sensor means positioned adjacent to said path upstream of said cut-off assembly for providing a sensor signal responsive to motion of the material along said path, and electronic control means coupled to said first and second motors and responsive to said sensor signal for synchronizing motion of said carriage and blade such that said blade intersects said path when said blade is traveling in the direction of said path at the speed of material traveling in said path.

26. The cut-off machine set forth in claim 25 wherein said radially-moving means comprises cam means mounted on said support in fixed position radially of said axis and cam follower means carried on said knife blade at a position to engage said cam means.

* * * * *